(12) United States Patent
Khude et al.

(10) Patent No.: US 12,028,149 B2
(45) Date of Patent: Jul. 2, 2024

(54) SYSTEM AND METHOD FOR RANGE EXTENSION OF WIRELESS NETWORKS

(71) Applicant: NXP USA, Inc., Austin, TX (US)

(72) Inventors: Nilesh Nilkanth Khude, Pune (IN); Sudhir Srinivasa, Los Gatos, CA (US); Hari Ram Balakrishnan, Chennai (IN); Ankit Sethi, Pune (IN); Vijay Ahirwar, Pune (IN)

(73) Assignee: NXP USA, Inc., Austin, TX (US)

( * ) Notice: Subject to any disclaimer, the term of this patent is extended or adjusted under 35 U.S.C. 154(b) by 220 days.

(21) Appl. No.: 17/664,968

(22) Filed: May 25, 2022

(65) Prior Publication Data

US 2023/0388002 A1    Nov. 30, 2023

(51) Int. Cl.
*H04B 7/155* (2006.01)
*H04W 52/38* (2009.01)

(52) U.S. Cl.
CPC ........ *H04B 7/15507* (2013.01); *H04W 52/38* (2013.01)

(58) Field of Classification Search
CPC ............................. H04B 7/15507; H04W 52/38
See application file for complete search history.

(56) References Cited

U.S. PATENT DOCUMENTS

| | | | |
|---|---|---|---|
| 9,019,991 B1 * | 4/2015 | Zhang | H04W 52/325 375/267 |
| 9,712,358 B2 | 7/2017 | Zhang et al. | |
| 10,389,562 B2 | 8/2019 | Zhang et al. | |
| 10,470,128 B2 * | 11/2019 | Noh | H04W 52/0229 |
| 10,979,543 B2 * | 4/2021 | Sun | H04W 4/70 |
| 11,496,278 B2 * | 11/2022 | Park | H04L 5/0048 |
| 11,736,227 B1 * | 8/2023 | Wu | H04L 1/0033 370/338 |
| 2016/0156750 A1 * | 6/2016 | Zhang | H04L 27/2613 370/338 |
| 2016/0227532 A1 * | 8/2016 | Azizi | H04L 5/001 |
| 2016/0352556 A1 * | 12/2016 | Zhu | H04L 27/2602 |
| 2017/0261591 A1 * | 9/2017 | Zhang | G01S 13/76 |
| 2017/0279640 A1 * | 9/2017 | Yang | H04L 1/0003 |
| 2017/0303280 A1 * | 10/2017 | Chun | H04L 27/2603 |
| 2018/0011179 A1 * | 1/2018 | Zhang | G01S 5/0205 |
| 2018/0083793 A1 * | 3/2018 | Kim | H04L 45/16 |
| 2018/0167235 A1 * | 6/2018 | Hu | H04L 25/0202 |
| 2019/0021106 A1 * | 1/2019 | Oteri | H04W 72/21 |
| 2019/0306806 A1 * | 10/2019 | Sood | H04W 52/243 |
| 2020/0154476 A1 * | 5/2020 | Kim | H04W 74/06 |
| 2020/0177319 A1 * | 6/2020 | Cariou | H04L 1/0008 |

(Continued)

*Primary Examiner* — Dominic E Rego

(57) ABSTRACT

A wireless network includes a client device and an access point (AP). The client device generates a data packet having a physical layer protocol data unit frame format. The client device transmits the data packet to the AP such that a plurality of long training fields (LTFs) of the data packet is transmitted at higher power as compared to a data field of the data packet, and a preamble portion of the data packet is transmitted at higher power as compared to the plurality of LTFs. Further, the data field includes various resource units (RUs) and one such RU is utilized for data transmission between the client device and the AP. The transmission of the data packet from the client device to the AP in the aforementioned manner results in the range extension of the wireless network.

20 Claims, 5 Drawing Sheets

(56) References Cited

U.S. PATENT DOCUMENTS

| | | | |
|---|---|---|---|
| 2021/0274484 A1* | 9/2021 | Park | H04W 72/0453 |
| 2021/0288768 A1* | 9/2021 | Yang | H04L 5/0044 |
| 2021/0367886 A1* | 11/2021 | Chen | H04L 45/74 |
| 2021/0391961 A1* | 12/2021 | Cao | H04L 1/08 |
| 2021/0392661 A1* | 12/2021 | Cao | H04L 5/0048 |
| 2022/0182176 A1* | 6/2022 | Nakano | H04W 28/04 |

* cited by examiner

SYSTEM AND METHOD FOR RANGE EXTENSION OF WIRELESS NETWORKS

FIELD OF USE

The present disclosure relates generally to wireless communication, and, more particularly, to a system and a method for range extension of wireless networks.

BACKGROUND

A wireless network includes various access points (APs) and client devices. A range of the wireless network corresponds to a maximum distance between an AP and a client device at which accurate data transmission between the AP and the client device is achieved. The range of the wireless network is controlled based on the transmission power of the APs and the client devices. Typically, the transmission power of the client devices is limited due to power amplifier limitations and Federal Communications Commission (FCC) regulations, which in turn, limits the range of the wireless network.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
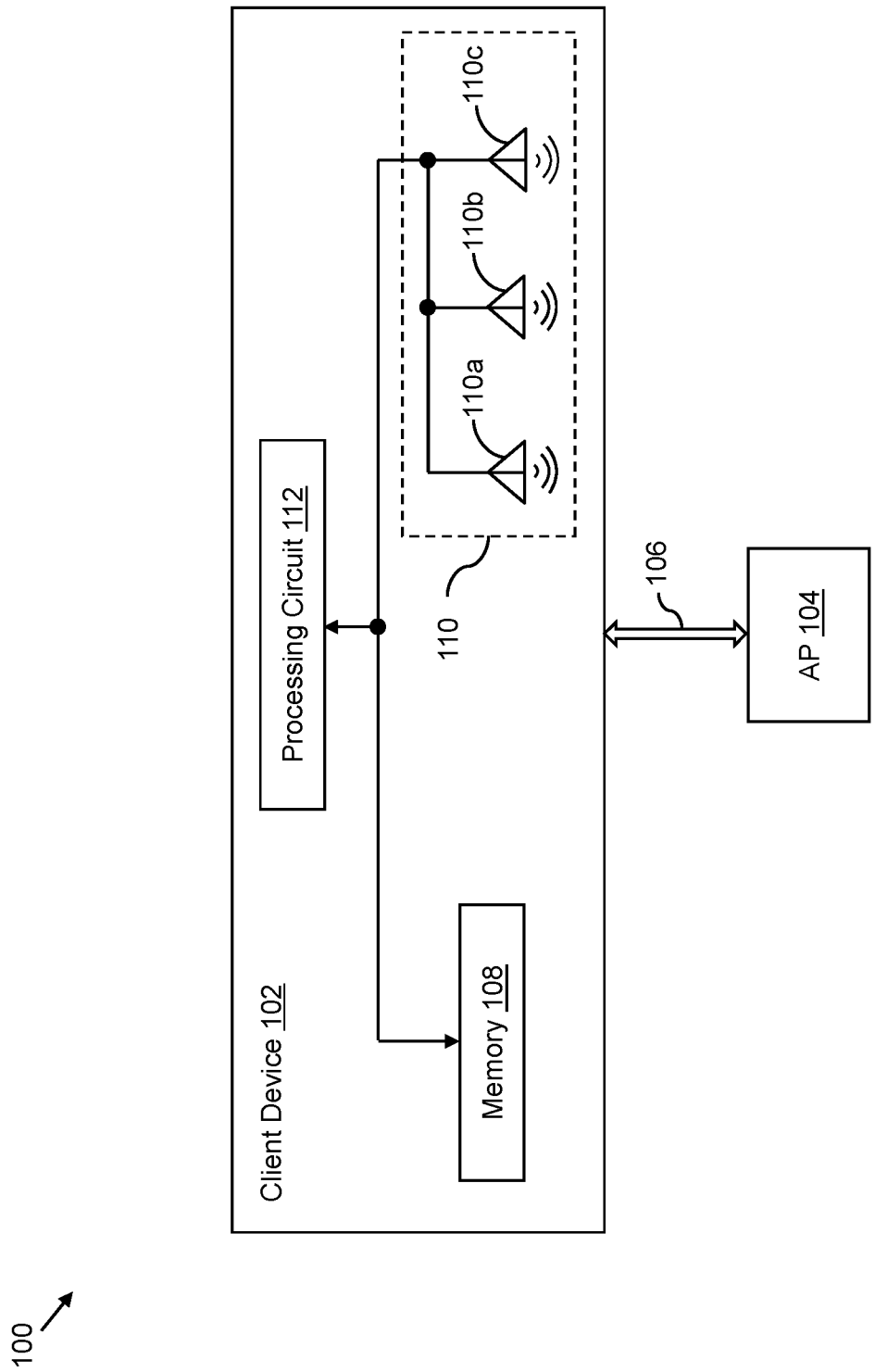
FIG. 1 illustrates a schematic block diagram of a wireless network in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, a client device of a wireless network is disclosed. The client device may include a processing circuit. The processing circuit may be configured to generate a data packet having a physical layer protocol data unit (PPDU) frame format. The data packet may include a preamble portion, a plurality of long training fields (LTFs) associated with the PPDU frame format, and a data field. Further, the data field may include a plurality of resource units (RUs). The processing circuit may be further configured to transmit the data packet to an access point (AP) of the wireless network. The data packet is transmitted to the AP such that the plurality of LTFs is transmitted with a first transmission power boost as compared to the data field, and the preamble portion is transmitted with a second transmission power boost as compared to the plurality of LTFs. Further, a first RU of the plurality of RUs is utilized for data transmission between the client device and the AP. A range of the client device of the wireless network is extended based on the transmission of the data packet from the client device to the AP.

In another embodiment of the present disclosure, a method for the range extension of a wireless network is disclosed. The method may include generating a data packet having a PPDU frame format by a client device of the wireless network. The data packet may include a preamble portion, a plurality of LTFs associated with the PPDU frame format, and a data field. Further, the data field may include a plurality of RUs. The method may further include transmitting the data packet by the client device to an AP of the wireless network. The data packet is transmitted to the AP such that the plurality of LTFs is transmitted with a first transmission power boost as compared to the data field, and the preamble portion is transmitted with a second transmission power boost as compared to the plurality of LTFs. Further, a first RU of the plurality of RUs is utilized for data transmission between the client device and the AP. A range of the client device of the wireless network is extended based on the transmission of the data packet from the client device to the AP.

In some embodiments, the transmission of the preamble portion to the AP with the second transmission power boost as compared to the plurality of LTFs may enable detection of the data packet at the AP. Further, the transmission of the plurality of LTFs to the AP with the first transmission power boost as compared to the data field may enable estimation of channel state information at the AP of a channel between the AP and the client device. The detection of the data packet, the estimation of the channel state information, and the utilization of the first RU for the data transmission may enable data decoding at the AP. The enabling of the data decoding at the AP may result in the range extension of the client device of the wireless network.

In some embodiments, the client device may further include a set of antennas that may be coupled to the processing circuit. The processing circuit may transmit the data packet to the AP using the set of antennas. The first transmission power boost and the second transmission power boost are corresponding increments in transmission power of the set of antennas.

In some embodiments, a number of LTFs of the plurality of LTFs may be greater than a number of spatial streams associated with the client device.

In some embodiments, the first RU may include a set of data tones that facilitates the data transmission between the client device and the AP. The first RU may further include a set of pilot tones that may be transmitted to the AP with a third transmission power boost as compared to the set of data tones to enable common phase error estimation and carrier frequency offset estimation at the AP. The common phase error estimation and the carrier frequency offset estimation may enable data decoding at the AP, and in turn, result in the range extension of the client device of the wireless network.

In some embodiments, the first RU may include a set of data tones that facilitates the data transmission between the client device and the AP. Each RU of the plurality of RUs may include a set of pilot tones that may be transmitted to the AP to enable common phase error estimation and carrier frequency offset estimation at the AP. The common phase error estimation and the carrier frequency offset estimation may enable data decoding at the AP, and in turn, result in the range extension of the client device of the wireless network.

In some embodiments, the transmission of the data packet to the AP is unsolicited.

In some embodiments, the PPDU frame format may be one of a group consisting of a high efficiency (HE) multi-user (MU) PPDU frame format and an extremely high throughput (EHT) MU PPDU frame format.

In some embodiments, the preamble portion may include a first signal field and a second signal field. The first signal field may be indicative of the data packet being an uplink data packet and the second signal field may be indicative of a station identifier of the AP, thereby indicating that the data transmission of the data packet to the AP is unsolicited. The second signal field may be further indicative of the first RU that is utilized for the data transmission. When the PPDU frame format is the HE MU PPDU frame format, the first signal field is a HE-signal-A field and the second signal field is a HE-signal-B field. When the PPDU frame format is the EHT MU PPDU frame format, the first signal field is a universal signal field and the second signal field is an EHT-signal field.

In some embodiments, the first signal field may be further indicative of at least one of a group consisting of the first transmission power boost and the second transmission power boost to enable data decoding at the AP.

In some embodiments, the PPDU frame format may be one of a group consisting of a HE trigger-based (TB) PPDU frame format, a HE single user (SU) PPDU frame format, a HE extended range (ER) PPDU frame format, and an EHT TB PPDU frame format.

In some embodiments, the preamble portion may include a signal field that may be indicative of the data packet being an uplink data packet and a station identifier of the AP, thereby indicating that the transmission of the data packet to the AP is unsolicited. The signal field may be further indicative of the first RU that is utilized for the data transmission. When the PPDU frame format is one of a group consisting of the HE TB PPDU frame format, the HE SU PPDU frame format, and the HE ER PPDU frame format, the signal field is a HE-signal-A field. When the PPDU frame format is the EHT TB PPDU frame format, the signal field is a universal signal field.

In some embodiments, the signal field may be further indicative of at least one of a group consisting of the first transmission power boost and the second transmission power boost to enable data decoding at the AP.

In some embodiments, the generated data packet may correspond to a frequency domain representation. Prior to the transmission of the data packet to the AP, the processing circuit may be further configured to execute a transformation operation on the data packet to convert the frequency domain representation of the data packet to a time domain representation. Further, the time domain representation of the data packet is transmitted to the AP.

In some embodiments, a bandwidth of the first RU may be less than a bandwidth of the plurality of LTFs as well as a bandwidth of the preamble portion.

Conventionally, to extend a range of a wireless network, an access point (AP) transmits a trigger frame to a client device and in response, receives an uplink data packet from the client device. As the transmission is triggered by the AP, the AP may accurately detect the preamble of the received data packet even if the data packet is received at low power, thereby resulting in the range extension of the wireless network. However, in such cases, the data transmission is initiated exclusively by the AP. Additionally, while the accurate preamble detection may be achieved, various other operations such as channel state information estimation, carrier frequency offset estimation, common phase error estimation, or the like, that are required for the range extension may not be accurate when the data packet is received at low power. Thus, the range of the wireless network remains limited.

Various embodiments of the present disclosure disclose a wireless network that includes a client device and an AP. The client device may include a processing circuit and a set of antennas. The processing circuit may generate a data packet having a physical layer protocol data unit (PPDU) frame format. Further, the processing circuit may transmit the data packet to the AP using the set of antennas. The processing circuit transmits the data packet such that a plurality of long training fields (LTFs) of the data packet is transmitted at higher power as compared to a data field of the data packet to enable accurate channel state information estimation at the AP. Similarly, a preamble portion of the data packet is transmitted at higher power as compared to the plurality of LTFs to enable accurate data packet detection at the AP. Further, the data field of the data packet may include various resource units (RUs). One such RU is utilized for data transmission between the client device and the AP. To enable accurate common phase error estimation and accurate carrier frequency offset estimation at the AP, pilot tones of all RUs are transmitted with the same power as that of data tones of the RU selected for the data transmission, or pilot tones of the selected RU are transmitted at higher power as compared to the associated data tones.

The utilization of a single RU for the data transmission, the detection of the data packet, the channel state information estimation, the common phase error estimation, and the carrier frequency offset estimation enable accurate data decoding at the AP. Further, the accurate data decoding results in the range extension of the wireless network (e.g., the range extension of the client device of the wireless network). Thus, the range of the wireless network of the present disclosure is significantly greater than that of a wireless network where conventional range extension techniques are implemented. Additionally, the transmission of the data packet to the AP is unsolicited (e.g., is initiated by the client device sans any trigger frame from the AP).

FIG. 1 illustrates a schematic block diagram of a wireless network 100 in accordance with an embodiment of the present disclosure. The wireless network 100 may include a client device 102 and an access point (AP) 104. The client device 102 may be coupled to the AP 104 by way of a channel 106. The wireless network 100 may correspond to a wireless local area network, a worldwide interoperability for microwave access network, a network that complies with the Institute of Electrical and Electronics Engineers (IEEE) 802.11 standard, or the like.

A range of the wireless network 100 is controlled by the transmission power of the client device 102 and the AP 104.

Typically, the transmission power of the client device 102 is limited, which in turn, limits the range of the wireless network 100. In the present disclosure, to extend the range of the wireless network 100 (e.g., the client device 102), the client device 102 may be configured to perform various operations. For example, the client device 102 may be configured to generate a data packet (shown later in FIGS. 2-5) and transmit the data packet to the AP 104 such that data decoding of the data packet at the AP 104 is accurate even when a distance between the client device 102 and the AP 104 is greater than a reference value (e.g., a range of a conventional wireless network). Thus, the transmission of the data packet from the client device 102 to the AP 104 results in the range extension of the wireless network 100 (e.g., the client device 102 of the wireless network 100). Further, the transmission of the data packet from the client device 102 to the AP 104 is unsolicited (e.g., is initiated by the client device 102 sans any trigger frame from the AP 104). The generation of the data packet and the transmission of the data packet from the client device 102 to the AP 104 are explained below in detail.

The client device 102 may include a memory 108, a set of antennas 110, and a processing circuit 112. Examples of the client device 102 may include, but are not limited to, desktops, laptops, tablets, mobile devices, phablets, televisions, set-top boxes, or other Internet of things (IoT) based devices.

The memory 108 may be configured to store various instructions that when executed by the processing circuit 112, cause the processing circuit 112 to extend the range of the client device 102. The instructions stored in the memory 108 are pursuant to various standards and protocols (e.g., the IEEE 802.11 standard) set forth for wireless communication. Examples of the memory 108 may include a solid-state drive, a random-access memory, a read-only memory, a hard disk drive, a flash memory, a removable storage device, or the like.

The set of antennas 110 may be configured to wirelessly transmit the data packet from the client device 102 to the AP 104. In an embodiment, the set of antennas 110 may include a first antenna 110a, a second antenna 110b, and a third antenna 110c. However, a number of antennas in the set of antennas 110 may be more than or less than three in other embodiments, without deviating from the scope of the present disclosure.

The processing circuit 112 may be coupled to the memory 108 and the set of antennas 110. Further, the processing circuit 112 may be coupled to the AP 104 by way of the set of antennas 110 and the channel 106. The processing circuit 112 may include suitable circuitry that may be configured to perform one or more operations. For example, the processing circuit 112 may be configured to extend the range of the wireless network 100 (e.g., the client device 102 of the wireless network 100).

To extend the range of the client device 102, the processing circuit 112 may be configured to execute various operations. For example, the processing circuit 112 may be configured to generate the data packet. The data packet may have a physical layer protocol data unit (PPDU) frame format. In one embodiment, the data packet may have a downlink (DL) PPDU frame format. Examples of the DL PPDU frame format may include a high efficiency (HE) multi-user (MU) PPDU frame format, an extremely high throughput (EHT) MU PPDU frame format, or the like. In another embodiment, the data packet may have an uplink (UL) PPDU frame format. Examples of the UL PPDU frame format may include a HE trigger-based (TB) PPDU frame format, a HE single user (SU) PPDU frame format, a HE extended range (ER) PPDU frame format, an EHT TB PPDU frame format, or the like.

The data packet may include a preamble portion, a short-training field (STF) associated with the PPDU frame format, and a plurality of long training fields (LTFs) associated with the PPDU frame format. Additionally, the data packet may include a data field and a packet extension (PE) field. For example, if the PPDU frame format corresponds to the HE MU PPDU format, the data packet may include a preamble portion, a HE-STF, a plurality of HE-LTFs, a data field, and a PE field. The data packets of different PPDU frame formats are illustrated in FIGS. 2-5. Each of the preamble portion, the STF, the plurality of LTFs, and the data field has a bandwidth in multiples of 20 megahertz (MHz). The preamble portion, the STF, the plurality of LTFs, the data field, and the PE field are shown later in FIGS. 2-5.

The preamble portion may be utilized to synchronize data transmission between the client device 102 and the AP 104 whereas the STF may be utilized to improve automatic gain control estimation at the AP 104 during the data transmission. The plurality of LTFs may be utilized for estimation of channel state information of the channel 106 at the AP 104. Typically, a number of LTFs included in a data packet is equal to a number of spatial streams transmitted by a transmitter (e.g., the client device 102 in the present disclosure). However, in the present disclosure, a number of LTFs of the plurality of LTFs is greater than a number of spatial streams of the client device 102 to increase the accuracy of the channel state information estimation at the AP 104. The data field may include data that is to be transmitted to the AP 104 whereas the PE field may be appended to the end of the data packet to provide a receiver (e.g., the AP 104) with additional processing time at the end of reception of the data packet.

The data field may include a plurality of resource units (RUs) of which first through fifth RUs are shown later in FIG. 2. The first through fifth RUs may be included in one symbol (e.g., one orthogonal frequency-division multiplexing symbol) of the data field. Although not shown, the data field may include multiple such symbols. A 20 MHz bandwidth of the data field (e.g., the symbol) may be divided into various RUs. For example, the symbol may include four 52-tone RUs and one 26-tone RU with each tone corresponding to 78.125 kilohertz (kHz). Alternatively, the symbol may include two 106-tone RUs and one 26-tone RU, or nine 26-tone RUs. The number of RUs and the number of tones in each RU may vary in other embodiments, without deviating from the scope of the present disclosure.

In the present disclosure, one RU of the plurality of RUs is utilized for the data transmission between the client device 102 and the AP 104 to increase the signal-to-noise ratio (SNR) of the transmitted data. For the sake of ongoing discussion, it is assumed that the first RU is utilized for the data transmission between the client device 102 and the AP 104 and that the first RU is a 26-tone RU or a 52-tone RU. Thus, the bandwidth of the first RU is less than the bandwidth of the preamble portion, the STF, and the plurality of LTFs. Each RU of the plurality of RUs may include a set of data tones and a set of pilot tones. The set of data tones and the set of pilot tones of the first RU are shown later in FIG. 2. The set of data tones of the first RU thus facilitates the data transmission between the client device 102 and the AP 104. The set of pilot tones, on the other hand, enable common phase error estimation and carrier frequency offset estimation at the AP 104. In other words, the set of pilot tones is utilized for tuning the AP 104 (e.g., for tuning transceivers of the AP 104 to receive the data included in the set of data tones).

The data packet with various populated fields may correspond to a frequency domain representation. To transmit the data packet to the AP 104, the processing circuit 112 may be further configured to execute a transformation operation (e.g., an inverse Fourier transform operation) on the data packet (e.g., each field of the data packet) to convert the frequency domain representation of the data packet to a time domain representation.

The processing circuit 112 may be further configured to transmit the data packet (e.g., the time domain representation of the data packet) to the AP 104 using the set of antennas 110. Thus, each field of the data packet may be converted from the frequency domain representation to the time domain representation prior to the transmission to the AP 104. The transmission of the data packet to the AP 104 is unsolicited. In other words, the transmission of the data packet to the AP 104 is initiated by the processing circuit 112 sans any trigger frame from the AP 104.

The processing circuit 112 may transmit various fields of the data packet to the AP 104 with different transmission power. For example, the plurality of LTFs is transmitted to the AP 104 with a first transmission power boost as compared to the data field, and the preamble portion is transmitted to the AP 104 with a second transmission power boost as compared to the plurality of LTFs. Further, the STF is transmitted to the AP 104 with a default transmission power that is less than the transmission power of the plurality of LTFs and the preamble portion. The entire data field may be transmitted to the AP 104 with the same transmission power. In such a scenario, the set of data tones of the first RU and the set of pilot tones of each RU of the plurality of RUs are transmitted to the AP 104 with the default transmission power. Alternatively, the entire data field may not be transmitted to the AP 104 with the same transmission power. In such a scenario, the set of data tones of the first RU is transmitted to the AP 104 with the default transmission power, and the set of pilot tones of the first RU is transmitted to the AP 104 with a third transmission power boost as compared to the set of data tones of the first RU. Further, the PE field is transmitted to the AP 104 with the default transmission power. In an example, the STF, the entire data field, and the PE field are transmitted with the default transmission power, the plurality of LTFs is transmitted with the transmission power that is 3 decibels (dB) more than the default transmission power, and the preamble portion is transmitted with the transmission power that is 6 dB more than the default transmission power.

The first transmission power boost and the second transmission power boost are corresponding increments in transmission power of the set of antennas 110. The transmission power of the set of antennas 110 is increased at certain intervals to achieve the first and second transmission power boosts. On the other hand, to achieve the third transmission power boost, the first RU is populated such that the set of pilot tones has a greater magnitude than the set of data tones. Although the transmission power of the set of antennas 110 is increased, the overall transmission power of the client device 102 remains within the power amplifier limitations and the Federal Communications Commission (FCC) regulations.

Various fields of the data packet are transmitted with different transmission power to ensure that the SNR of the data packet received at the AP 104 is such that the data packet may be accurately detected and decoded even when the distance between the client device 102 and the AP 104 is greater than the reference value. For example, the preamble portion is transmitted to the AP 104 with the second transmission power boost as compared to the plurality of LTFs to enable detection of the data packet (e.g., the preamble portion of the data packet) at the AP 104. In other words, the transmission of the preamble portion in such a manner results in an increase in the SNR of the preamble portion to a value that enables the accurate detection of the data packet at the AP 104. Similarly, the plurality of LTFs is transmitted to the AP 104 with the first transmission power boost as compared to the data field to enable the estimation of the channel state information of the channel 106 at the AP 104. In other words, the transmission of the plurality of LTFs in such a manner results in an increase in the SNR of the plurality of LTFs to a value that enables the accurate estimation of the channel state information of the channel 106 at the AP 104. The synchronization between the client device 102 and the AP 104 is enabled based on the estimated channel state information.

The set of data tones of the first RU is transmitted to the AP 104 to facilitate the data transmission between the client device 102 and the AP 104. The utilization of a single RU (e.g., the first RU) for the data transmission results in an increase in per-tone SNR of the data transmitted in the data field. Further, the set of pilot tones of the first RU is transmitted to the AP 104 with the third transmission power boost as compared to the set of data tones to enable the common phase error estimation and the carrier frequency offset estimation at the AP 104. Alternatively, to enable the common phase error estimation and the carrier frequency offset estimation at the AP 104, the set of pilot tones of each RU of the plurality of RUs is transmitted to the AP 104 with the same transmission power as with which the set of data tones of the first RU is transmitted. In other words, for both the scenarios, the SNR of the data field increases to a value that enables the common phase error estimation and the carrier frequency offset estimation at the AP 104. The common phase error estimation and the carrier frequency offset estimation facilitate common phase error correction and carrier frequency offset correction at the AP 104, respectively, which in turn, improve the synchronization between the client device 102 and the AP 104.

The detection of the data packet, the estimation of the channel state information, the utilization of the first RU for the data transmission, the common phase error estimation, and the carrier frequency offset estimation enable the data decoding at the AP 104. The preamble portion may be additionally indicative of at least one of the first and second transmission power boosts to further enable the data decoding at the AP 104. The enabling of the data decoding at the AP 104 results in the range extension of the client device 102 of the wireless network 100. In other words, the detection of the data packet, the estimation of the channel state information, the utilization of the first RU for the data transmission, the common phase error estimation, and the carrier frequency offset estimation result in the range extension of the client device 102 of the wireless network 100. Thus, the range of the wireless network 100 (e.g., the client device 102 of the wireless network 100) is extended based on the transmission of the data packet from the client device 102 to the AP 104.

The AP 104 may be coupled to the client device 102. The AP 104 may be configured to receive the data packet from the client device 102. When the data packet is transmitted from the client device 102 to the AP 104, the AP 104 may be configured to detect the data packet based on the boosted preamble portion. Further, the AP 104 may be configured to estimate the channel state information of the channel 106 based on the boosted plurality of LTFs. Additionally, the AP 104 may be configured to estimate the common phase error and the carrier frequency offset based on the boosted set of pilot tones of the first RU or the set of pilot tones of each RU of the plurality of RUs. The AP 104 may be further configured to decode the data packet (e.g., the data field of the data packet) based on the estimated channel state information, the estimated common phase error, and the estimated carrier frequency offset. The AP 104 decodes the data packet accurately even when the client device 102 is located at a distance greater than the reference value as a result of the transmission of the data packet in the aforementioned manner. Examples of the AP 104 may include a wireless gateway, a cable modem, a wireless router, a mobile hot-spot router, a mobile phone having the capability to create a hot-spot, a wireless range extender, a multimedia over coaxial alliance node, or the like.

Although it is described that the range of the client device 102 is extended based on the transmission of the data packet to the AP 104, the scope of the present disclosure is not limited to it. In various other embodiments, to extend the range of the client device 102, the AP 104 may be additionally configured to schedule the client device 102 by allocating a single RU to the client device 102 even if the remaining RUs are available for allocation, thereby increasing the SNR of the data received at the client device 102.

Figure 2:
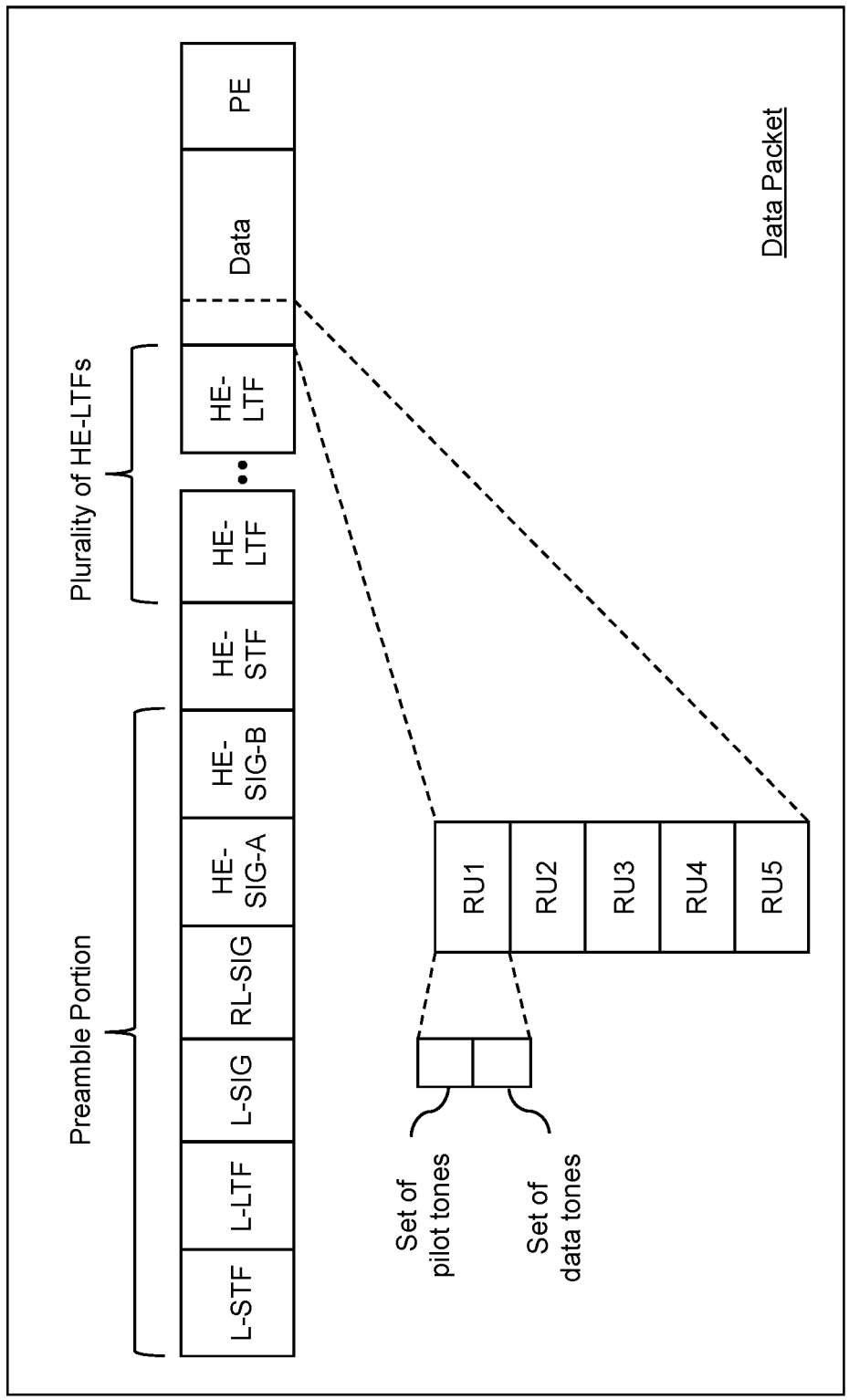
FIG. 2 is a schematic diagram that illustrates a data packet having a high efficiency (HE) multi-user (MU) physical layer protocol data unit (PPDU) frame format in accordance with an embodiment of the present disclosure.

FIG. 2 is a schematic diagram that illustrates the data packet having the HE MU PPDU frame format in accordance with an embodiment of the present disclosure. The data packet may include the preamble portion, the HE-STF (shown as "HE-STF" in FIG. 2), the plurality of HE-LTFs (each shown as "HE-LTF" in FIG. 2), the data field (shown as "Data" in FIG. 2), and the PE field (shown as "PE" in FIG. 2).

The preamble portion may include a legacy preamble. The legacy preamble may include a legacy STF (shown as "L-STF" in FIG. 2), a legacy LTF (shown as "L-LTF" in FIG. 2), and a legacy signal field (shown as "L-SIG" in FIG. 2). The legacy preamble facilitates backward compatibility and coexistence with the legacy APs. The preamble portion may further include a repeated legacy signal field (shown as "RL-SIG" in FIG. 2) that is utilized to differentiate the HE frame format from a legacy frame format, a high throughput (HT) frame format, and a very high throughput (VHT) frame format.

The preamble portion may further include a first signal field and a second signal field. For the HE MU PPDU frame format, the first signal field is a HE-signal-A field (shown as "HE-SIG-A" in FIG. 2) and the second signal field is a HE-signal-B field (shown as "HE-SIG-B" in FIG. 2). The HE-signal-A and HE-signal-B fields may include information that is necessary to decode the data packet. For example, the HE-signal-A field is indicative of the data packet being an uplink data packet and the HE-signal-B field is indicative of a station identifier (ID) of the AP 104. The HE-signal-A and HE-signal-B fields thus indicate that the transmission of the data packet from the client device 102 to the AP 104 is unsolicited. The HE-signal-B field is further indicative of the first RU that is utilized for the data transmission. Further, the HE-signal-A field may be indicative of the first and second transmission power boosts. The indication of the first and second transmission power boosts in the HE-signal-A facilitates the estimation of the channel state information of the channel 106 at the AP 104 and the detection of the data packet at the AP 104, respectively. In other words, the indication of the first and second transmission power boosts in the HE-signal-A field facilitates the data decoding at the AP 104. Reserved bits of the HE-signal-A field are utilized to indicate the first and second transmission power boosts.

The HE-STF is utilized for improving the automatic gain control estimation at the AP 104. Further, the plurality of HE-LTFs enables the estimation of the channel state information at the AP 104.

The data field may include the first through fifth RUs (shown as "RU1", "RU2", "RU3", "RU4", and "RU5" in FIG. 2). The first RU includes the set of data tones and the set of pilot tones as illustrated in FIG. 2. Although not shown, each remaining RU (e.g., the second through fifth RUs) similarly includes one set of data tones and one set of pilot tones. One RU (e.g., the first RU) is utilized for the data transmission between the client device 102 and the AP 104. For enabling the common phase error estimation and the carrier frequency offset estimation at the AP 104, the set of pilot tones of the first RU is transmitted with the third transmission power boost as compared to the set of data tones of the first RU. Alternatively, the set of pilot tones of each RU of the first through fifth RUs are transmitted with the same transmission power as that of the set of data tones of the first RU for enabling the common phase error estimation and the carrier frequency offset estimation at the AP 104. When the set of pilot tones of each RU of the first through fifth RUs is transmitted to the AP 104, the reserved bits of the HE-signal-A field may be utilized to indicate to the AP 104 that the set of pilot tones of each RU of the first through fifth RUs is transmitted.

Although it is described that the first transmission power boost is communicated to the AP 104 by way of the HE-signal-A field, the scope of the present disclosure is not limited to it. In various other embodiments, the first transmission power boost may not be communicated to the AP 104, without deviating from the scope of the present disclosure. In such a scenario, the modulation scheme associated with the data field may be limited to binary phase-shift keying and quadrature phase-shift keying as utilization of any other modulation scheme may lead to inaccurate data decoding.

Figure 3:
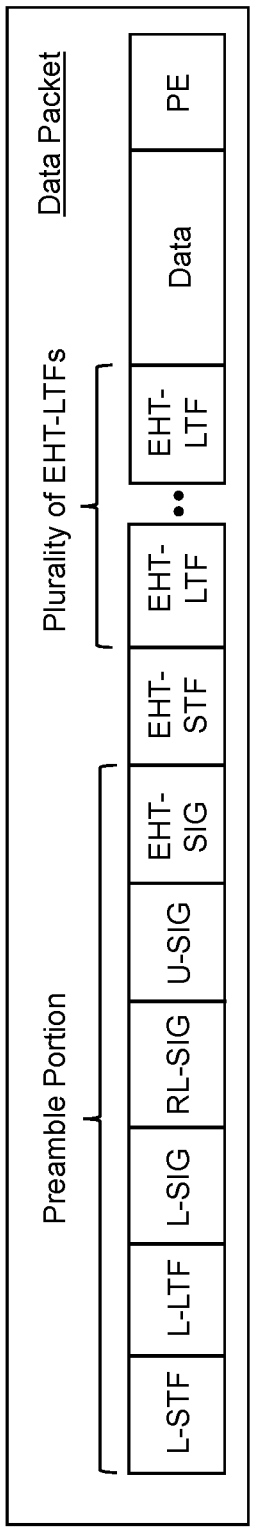
FIG. 3 is a schematic diagram that illustrates a data packet having an extremely high throughput (EHT) MU PPDU frame format in accordance with an embodiment of the present disclosure.

FIG. 3 is a schematic diagram that illustrates the data packet having the EHT MU PPDU frame format in accordance with an embodiment of the present disclosure. The data packet may include the preamble portion, the EHT-STF (shown as "EHT-STF" in FIG. 3), the plurality of EHT-LTFs (each shown as "EHT-LTF" in FIG. 3), the data field (shown as "Data" in FIG. 3), and the PE field (shown as "PE" in FIG. 3).

The preamble portion of the data packet may include the legacy preamble (shown as "L-STF", "L-LTF", and "L-SIG" in FIG. 3), the repeated legacy signal field (shown as "RL-SIG" in FIG. 3), the first signal field, and the second signal field. For the EHT MU PPDU frame format, the first signal field is a universal signal field (shown as "U-SIG" in FIG. 3) and the second signal field is an EHT-signal field (shown as "EHT-SIG" in FIG. 3). The universal signal field and the EHT-signal field may include information that is necessary to decode the data packet. For example, the universal signal field is indicative of the data packet being the uplink data packet and the EHT-signal field is indicative of the station ID of the AP 104. The universal signal field and the EHT-signal field thus indicate that the transmission of the data packet from the client device 102 to the AP 104 is unsolicited. The EHT-signal field is further indicative of the first RU that is utilized for the data transmission. The universal signal field is further indicative of the first and second transmission power boosts to facilitate the data decoding at the AP 104. Reserved bits of the universal signal field are utilized to indicate the first and second transmission power boosts.

The EHT-STF, the plurality of EHT-LTFs, the data field, and the PE field may be similar to the arrangement of the HE-STF, the plurality of HE-LTFs, the data field, and the PE field, respectively, as illustrated in FIG. 2.

Figure 4:
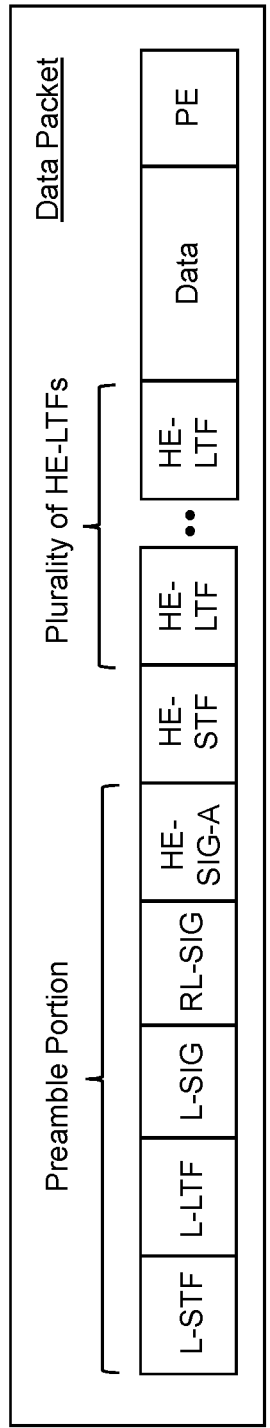
FIG. 4 is a schematic diagram that illustrates a data packet having a HE trigger-based (TB) PPDU frame format in accordance with an embodiment of the present disclosure.

FIG. 4 is a schematic diagram that illustrates the data packet having the HE TB PPDU frame format in accordance with an embodiment of the present disclosure. The data packet may include the preamble portion, the HE-STF (shown as "HE-STF" in FIG. 4), the plurality of HE-LTFs (each shown as "HE-LTF" in FIG. 4), the data field (shown as "Data" in FIG. 4), and the PE field (shown as "PE" in FIG. 4).

The difference between the data packet of FIG. 4 and the data packet of FIG. 2 is in the structure of the preamble portion. For example, the HE-signal-B field of FIG. 2 is absent in the data packet of FIG. 4. In such a scenario, the information included in the HE-signal-B is included in the HE-signal-A field (shown as "HE-SIG-A" in FIG. 4). Thus, the HE-signal-A field may be indicative of the data packet being the uplink data packet and the station ID of the AP 104, thereby indicating that the transmission of the data packet to the AP 104 is unsolicited. The HE-signal-A field may be further indicative of the first and second transmission power boosts and the first RU that is utilized for the data transmission. Reserved bits of the HE-signal-A field may be utilized to indicate the station ID of the AP 104 and the first RU. The data packets having the HE SU PPDU frame format and the HE ER PPDU frame format are similar to the data packet illustrated in FIG. 4.

Figure 5:
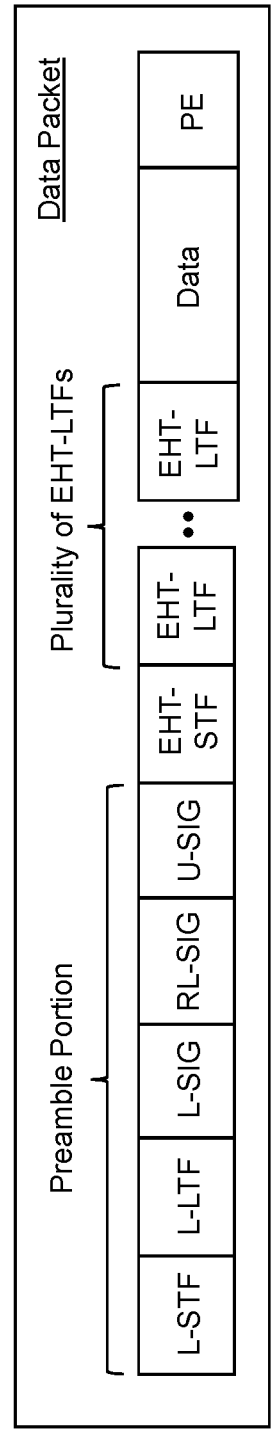
FIG. 5 is a schematic diagram that illustrates a data packet having an EHT TB PPDU frame format in accordance with an embodiment of the present disclosure.

FIG. 5 is a schematic diagram that illustrates the data packet having the EHT TB PPDU frame format in accordance with an embodiment of the present disclosure. The data packet may include the preamble portion, the EHT-STF (shown as "EHT-STF" in FIG. 5), the plurality of EHT-LTFs (each shown as "EHT-LTF" in FIG. 5), the data field (shown as "Data" in FIG. 5), and the PE field (shown as "PE" in FIG. 5).

The difference between the data packet of FIG. 5 and the data packet of FIG. 3 is in the structure of the preamble portion. For example, the EHT signal field of FIG. 3 is absent in the data packet of FIG. 5. In such a scenario, the information included in the EHT signal field is included in the universal signal field (shown as "U-SIG" in FIG. 5). Thus, the universal signal field is indicative of the data packet being the uplink data packet and the station ID of the AP 104, thereby indicating that the transmission of the data packet to the AP 104 is unsolicited. The universal signal field may be further indicative of the first and second transmission power boosts and the first RU that is utilized for the data transmission. Reserved bits of the universal signal field may be utilized for indicating the station ID of the AP 104 and the first RU.

Although not shown, the data packets of FIGS. 2-5 may additionally include a repeated first signal field (e.g., a repeated HE-signal-A field or a repeated universal signal field). The reserved bits of the first signal field may further indicate the presence of the repeated first signal field to notify the AP 104 to combine data extracted from the first signal field and the repeated first signal field. The repeated first signal field thus further enables the data decoding at the AP 104.

Figure 6:
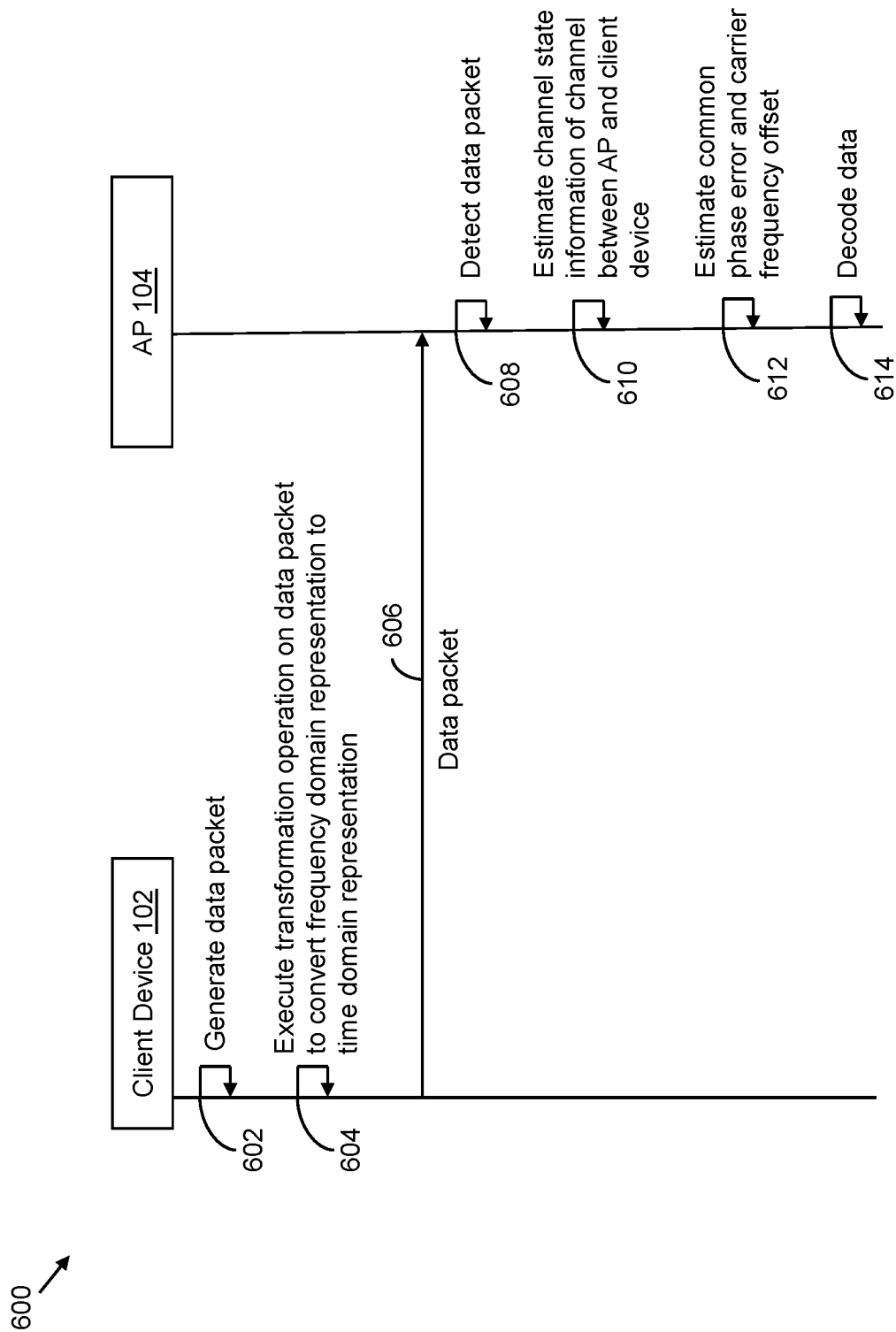
FIG. 6 represents a sequence diagram that illustrates the range extension of the wireless network of FIG. 1 in accordance with an embodiment of the present disclosure.

FIG. 6 represents a sequence diagram 600 that illustrates the range extension of the wireless network 100 in accordance with an embodiment of the present disclosure. The client device 102 may generate the data packet (as shown by arrow 602). The generated data packet corresponds to the frequency domain representation. Further, the client device 102 may execute the transformation operation on the data packet to convert the frequency domain representation of the data packet to the time domain representation (as shown by arrow 604). Further, the client device 102 may transmit the time domain representation of the data packet to the AP 104 (as shown by arrow 606). Each field of the data packet may be converted from the frequency domain representation to the time domain representation prior to the transmission to the AP 104.

Various fields of the data packet are transmitted with different transmission power. For example, the plurality of LTFs is transmitted with the first transmission power boost as compared to the data field, and the preamble portion is transmitted with the second transmission power boost as compared to the plurality of LTFs. The STF may be transmitted with the default transmission power. Additionally, the data field may be transmitted with the default transmission power. In such a scenario, the set of pilot tones of all RUs of the data field may be utilized (e.g., may be populated with known patterns and transmitted to the AP 104). Alternatively, the set of data tones of the first RU which is utilized for the data transmission is transmitted with the default transmission power and the set of pilot tones of the first RU is transmitted with the third transmission power boost as compared to the set of data tones of the first RU.

The AP 104 may detect the data packet as the preamble portion is transmitted with the second transmission power boost (as shown by arrow 608). Further, the AP 104 may estimate the channel state information of the channel 106 based on the plurality of LTFs and the first transmission power boost indicated in the preamble portion (as shown by arrow 610). The AP 104 may further estimate the common phase error and the carrier frequency offset based on the boosted set of pilot tones of the first RU or the set of pilot tones of each RU of the plurality of RUs (as shown by arrow 612). The AP 104 may decode the data included in the data field of the received data packet based on the estimated channel state information, the estimated common phase error, and the estimated carrier frequency offset (as shown by arrow 614). As the AP 104 accurately decodes the data included in the data packet, even when the client device 102 is located at a distance greater than the reference value, the transmission range of the client device 102 is extended.

Figure 7:
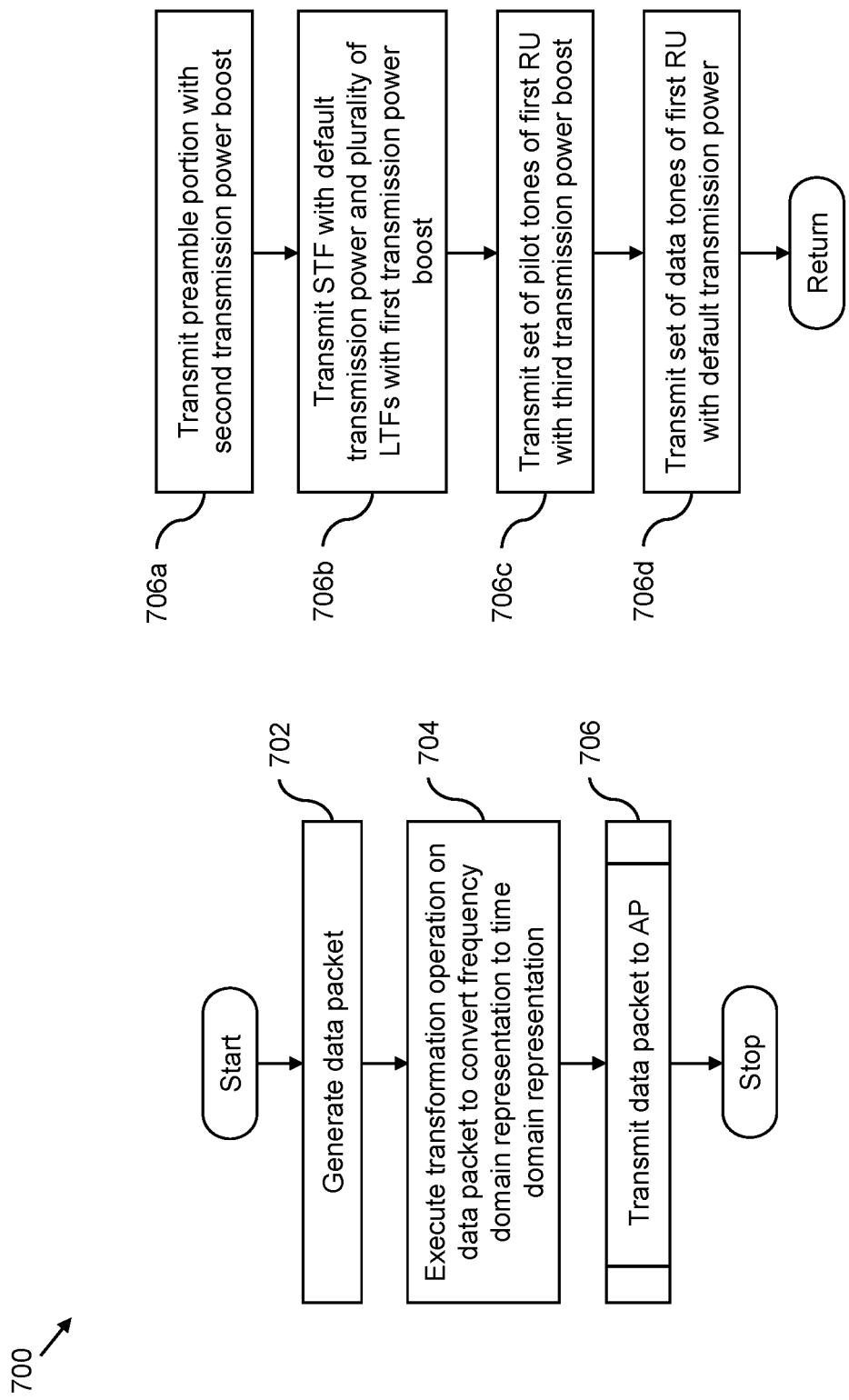
FIG. 7 represents a flowchart that illustrates a method for the range extension of the wireless network of FIG. 1 in accordance with an embodiment of the present disclosure.

FIG. 7 represents a flowchart 700 that illustrates a method for the range extension of the wireless network 100 in accordance with an embodiment of the present disclosure. At step 702, the client device 102 may generate the data packet. The data packet may have the PPDU frame format. The data packet may include the preamble portion, the STF associated with the PPDU frame format, the plurality of LTFs associated with the PPDU frame format, the data field, and the PE field. At step 704, the client device 102 may execute the transformation operation on the data packet to convert the frequency domain representation of the data packet to the time domain representation. At step 706, the client device 102 may transmit the time domain representation of the data packet to the AP 104. Each field of the data packet may be converted from the frequency domain representation to the time domain representation prior to the transmission to the AP 104.

The transmission of the data packet to the AP 104 may include various operations. For example, at step 706*a*, the client device 102 may transmit the preamble portion of the data packet with the second transmission power boost as compared to the plurality of LTFs to enable the data packet detection at the AP 104. Similarly, at step 706*b*, the client device 102 may transmit the STF with the default transmission power and the plurality of LTFs with the first transmission power boost as compared to the data field (e.g., the default transmission power). The plurality of the LTFs is transmitted with the first transmission power boost to enable the estimation of the channel state information of the channel 106 at the AP 104. At step 706*c*, the client device 102 may transmit the set of pilot tones of the first RU with the third transmission power boost as compared to the set of data tones of the first RU to enable the carrier frequency offset estimation and the common phase error estimation at the AP 104. At step 706*d*, the client device 102 may transmit the set of data tones of the first RU with the default transmission power.

The detection of the data packet, the channel state information estimation, the carrier frequency offset estimation, and the common phase error estimation enable the data decoding at the AP 104. The accurate data decoding at the AP 104 results in the range extension of the wireless network 100 (e.g., the client device 102 of the wireless network 100).

The flowchart 700 corresponds to the utilization of the boosted set of pilot tones of the first RU for enabling the common phase error estimation and the carrier frequency offset estimation at the AP 104. However, the scope of the present disclosure is not limited to it. In another embodiment, instead of step 706*c*, the set of pilot tones of each RU of the plurality of RUs may be transmitted with the default transmission power to enable the carrier frequency offset estimation and the common phase error estimation at the AP 104.

Conventionally, to extend a range of a wireless network, an AP transmits a trigger frame to a client device and in response, receives an uplink data packet from the client device. The AP may accurately detect the preamble of the received data packet even if the data packet is received at low power as the transmission is triggered by the AP. Such a transmission results in the range extension of the wireless network. However, in such cases, the data transmission is initiated exclusively by the AP. Additionally, while accurate preamble detection may be achieved, various other operations such as channel state information estimation, carrier frequency offset estimation, common phase error estimation, or the like, may not be accurate when the data packet is received at low power. Thus, the range of such a wireless network remains limited.

In the present disclosure, the utilization of a single RU for the data transmission, the detection of the data packet, the channel state information estimation, the common phase error estimation, and the carrier frequency offset estimation enable the accurate data decoding at the AP 104. Further, the accurate data decoding results in the range extension of the wireless network 100 (e.g., the client device 102 of the wireless network 100). Thus, the range of the wireless network 100 is significantly greater than that of a wireless network where conventional range extension techniques are implemented. Additionally, the transmission of the data packet to the AP 104 is unsolicited (e.g., is initiated by the client device 102 sans any trigger frame from the AP 104). Thus, the client device 102 may independently enable the range extension of the wireless network 100.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A client device of a wireless network, comprising:
a processing circuit configured to:
generate a data packet having a physical layer protocol data unit (PPDU) frame format, wherein the data packet comprises (i) a preamble portion, (ii) a plurality of long training fields (LTFs) associated with the PPDU frame format, and (iii) a data field, and wherein the data field comprises a plurality of resource units (RUs); and
transmit the data packet to an access point (AP) of the wireless network, wherein the data packet is transmitted to the AP such that (i) the plurality of LTFs is transmitted with a first transmission power boost as compared to the data field, (ii) the preamble portion is transmitted with a second transmission power boost as compared to the plurality of LTFs, and (iii) a first RU of the plurality of RUs is utilized for data transmission between the client device and the AP, and wherein a range of the client device of the wireless network is extended based on the transmission of the data packet from the client device to the AP.

2. The client device of claim 1, wherein the preamble portion is transmitted to the AP with the second transmission power boost as compared to the plurality of LTFs to enable detection of the data packet at the AP, wherein the plurality of LTFs is transmitted to the AP with the first transmission power boost as compared to the data field to enable estimation of channel state information at the AP of a channel between the AP and the client device, wherein the detection of the data packet, the estimation of the channel state information, and the utilization of the first RU for the data transmission enable data decoding at the AP, and wherein the enabling of the data decoding at the AP results in the range extension of the client device of the wireless network.

3. The client device of claim 1, further comprising a set of antennas that is coupled to the processing circuit, wherein the processing circuit transmits the data packet to the AP using the set of antennas, and wherein the first transmission power boost and the second transmission power boost are corresponding increments in transmission power of the set of antennas.

4. The client device of claim 1, wherein a number of LTFs of the plurality of LTFs is greater than a number of spatial streams associated with the client device.

5. The client device of claim 1, wherein the first RU comprises a set of data tones that facilitates the data transmission between the client device and the AP, wherein the first RU further comprises a set of pilot tones that is transmitted to the AP with a third transmission power boost as compared to the set of data tones to enable common phase error estimation and carrier frequency offset estimation at the AP, and wherein the common phase error estimation and the carrier frequency offset estimation enable data decoding at the AP, and in turn, result in the range extension of the client device of the wireless network.

6. The client device of claim 1, wherein the first RU comprises a set of data tones that facilitates the data transmission between the client device and the AP, wherein each RU of the plurality of RUs comprises a set of pilot tones that is transmitted to the AP to enable common phase error estimation and carrier frequency offset estimation at the AP, and wherein the common phase error estimation and the carrier frequency offset estimation enable data decoding at the AP, and in turn, result in the range extension of the client device of the wireless network.

7. The client device of claim 1, wherein the transmission of the data packet to the AP is unsolicited.

8. The client device of claim 1, wherein the generated data packet corresponds to a frequency domain representation, wherein prior to the transmission of the data packet to the AP, the processing circuit is further configured to execute a transformation operation on the data packet to convert the frequency domain representation of the data packet to a time domain representation, and wherein the time domain representation of the data packet is transmitted to the AP.

9. The client device of claim 1, wherein the PPDU frame format is one of a group consisting of a high efficiency (HE) multi-user (MU) PPDU frame format and an extremely high throughput (EHT) MU PPDU frame format.

10. The client device of claim 9, wherein the preamble portion comprises a first signal field and a second signal field, wherein the first signal field is indicative of the data packet being an uplink data packet and the second signal field is indicative of a station identifier of the AP, thereby indicating that the transmission of the data packet to the AP is unsolicited, wherein the second signal field is further indicative of the first RU that is utilized for the data transmission, and wherein when the PPDU frame format is the HE MU PPDU frame format, the first signal field is a HE-signal-A field and the second signal field is a HE-signal-B field, and when the PPDU frame format is the EHT MU PPDU frame format, the first signal field is a universal signal field and the second signal field is an EHT-signal field.

11. The client device of claim 10, wherein the first signal field is further indicative of at least one of a group consisting of the first transmission power boost and the second transmission power boost to enable data decoding at the AP.

12. The client device of claim 1, wherein the PPDU frame format is one of a group consisting of a HE trigger-based (TB) PPDU frame format, a HE single user (SU) PPDU frame format, a HE extended range (ER) PPDU frame format, and an EHT TB PPDU frame format.

13. The client device of claim 12, wherein the preamble portion comprises a signal field that is indicative of the data packet being an uplink data packet and a station identifier of the AP, thereby indicating that the transmission of the data packet to the AP is unsolicited, wherein the signal field is further indicative of the first RU that is utilized for the data transmission, and wherein when the PPDU frame format is one of a group consisting of the HE TB PPDU frame format, the HE SU PPDU frame format, and the HE ER PPDU frame format, the signal field is a HE-signal-A field, and when the PPDU frame format is the EHT TB PPDU frame format, the signal field is a universal signal field.

14. The client device of claim 13, wherein the signal field is further indicative of at least one of a group consisting of the first transmission power boost and the second transmission power boost to enable data decoding at the AP.

15. The client device of claim 1, wherein a bandwidth of the first RU is less than (i) a bandwidth of the plurality of LTFs and (ii) a bandwidth of the preamble portion.

16. A method for range extension of a wireless network, the method comprising:
generating, by a client device of the wireless network, a data packet having a physical layer protocol data unit (PPDU) frame format, wherein the data packet comprises (i) a preamble portion, (ii) a plurality of long training fields (LTFs) associated with the PPDU frame format, and (iii) a data field, and wherein the data field comprises a plurality of resource units (RUs); and
transmitting, by the client device, the data packet to an access point (AP) of the wireless network, wherein the data packet is transmitted to the AP such that (i) the plurality of LTFs is transmitted with a first transmission power boost as compared to the data field, (ii) the preamble portion is transmitted with a second transmission power boost as compared to the plurality of LTFs, and (iii) a first RU of the plurality of RUs is utilized for data transmission between the client device and the AP, and wherein a range of the client device of the wireless network is extended based on the transmission of the data packet from the client device to the AP.

17. The method of claim 16, wherein the preamble portion is transmitted to the AP with the second transmission power boost as compared to the plurality of LTFs to enable detection of the data packet at the AP, wherein the plurality of LTFs is transmitted to the AP with the first transmission power boost as compared to the data field to enable estimation of channel state information at the AP of a channel between the AP and the client device, wherein the detection of the data packet, the estimation of the channel state information, and the utilization of the first RU for the data transmission enable data decoding at the AP, and wherein the enabling of the data decoding at the AP results in the range extension of the client device of the wireless network.

18. The method of claim 16, wherein the first RU comprises a set of data tones that facilitates the data transmission between the client device and the AP, wherein the first RU further comprises a set of pilot tones that is transmitted to the AP with a third transmission power boost as compared to the set of data tones to enable common phase error estimation and carrier frequency offset estimation at the AP, and wherein the common phase error estimation and the carrier frequency offset estimation enable data decoding at the AP, and in turn, result in the range extension of the client device of the wireless network.

19. The method of claim 16, wherein the first RU comprises a set of data tones that facilitates the data transmission between the client device and the AP, wherein each RU of the plurality of RUs comprises a set of pilot tones that is transmitted to the AP to enable common phase error estimation and carrier frequency offset estimation at the AP, and wherein the common phase error estimation and the carrier frequency offset estimation enable data decoding at the AP, and in turn, result in the range extension of the client device of the wireless network.

20. The method of claim 16, further comprising executing, by the client device prior to the transmission of the data packet to the AP, a transformation operation on the data packet to convert a frequency domain representation of the data packet to a time domain representation, wherein the time domain representation of the data packet is transmitted to the AP, and wherein the transmission of the time domain representation of the data packet to the AP is unsolicited.

* * * * *